United States Patent
Sethi et al.

(10) Patent No.: US 10,305,900 B2
(45) Date of Patent: May 28, 2019

(54) ESTABLISHING A SECURE CONNECTION BETWEEN A MASTER DEVICE AND A SLAVE DEVICE

(71) Applicant: Telefonaktiebolaget LM Ericsson (publ), Stockholm (SE)

(72) Inventors: Mohit Sethi, Espoo (FI); Patrik Salmela, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 314 days.

(21) Appl. No.: 15/029,927

(22) PCT Filed: Oct. 15, 2013

(86) PCT No.: PCT/SE2013/051205
§ 371 (c)(1),
(2) Date: Apr. 15, 2016

(87) PCT Pub. No.: WO2015/057116
PCT Pub. Date: Apr. 23, 2015

(65) Prior Publication Data
US 2016/0234214 A1      Aug. 11, 2016

(51) Int. Cl.
*H04L 9/32*    (2006.01)
*H04L 29/06*   (2006.01)
(Continued)

(52) U.S. Cl.
CPC .......... *H04L 63/0884* (2013.01); *H04L 9/321* (2013.01); *H04L 63/06* (2013.01);
(Continued)

(58) Field of Classification Search
CPC ..... H04L 63/0884; H04L 9/321; H04L 63/06; H04W 12/04; H04W 12/06; H04W 63/18
See application file for complete search history.

(56) References Cited

U.S. PATENT DOCUMENTS 6,285,471 B1 * 9/2001 Pornbacher ........ H04N 1/00127
                                               348/E7.083
7,409,550 B2 * 8/2008 Avramopoulos ...... H04L 9/0841
                                               380/270
(Continued)

FOREIGN PATENT DOCUMENTS

EP           1650915 A1    4/2006

OTHER PUBLICATIONS

Translation of Hisahiro Fukuda (JP 2012029225) (obtained Jan. 29, 2019).*
(Continued)

*Primary Examiner* — Sharon S Lynch
(74) *Attorney, Agent, or Firm* — Sage Patent Group (57) ABSTRACT

A method (200) of establishing a secure connection (213) between a master device (101) and a slave device (102), sharing at least a first communication channel, is provided. The method comprises transmitting (201) an identifier $ID_M$ of the master device over the first communication channel, generating (202) a proof-of-possession $X_S$ of a key $K_S$, using $K_S$, $ID_M$, and a first identifier $ID_{Si}$ of the slave device, generating (202) a key $MK_S$ using $ID_M$, $ID_{Si}$, and $K_S$, storing (204) $MK_S$, and transmitting (203) $ID_{Si}$ and $X_S$ to the master device. The method further comprises transmitting (205) $ID_{Si}$, $X_S$, and $ID_M$, to a bootstrapping server, acquiring (206) $K_S$ using $ID_{Si}$, and generating (207) a proof-of-possession $X_B$ of $K_S$ using $K_S$, $ID_M$, and $ID_{Si}$. The method further comprises, if $X_B$ and $X_S$ are identical (208), generating (210) a key $MK_B$ using $ID_M$, $ID_{Si}$, and $K_S$, and transmitting (211) $MK_B$ to the master device where it is stored (212). Optionally, $ID_{Si}$ and $X_S$ may be transmitted (203) to the master device over a second, preferably location-limited, communication channel, such as audio or video.

27 Claims, 5 Drawing Sheets

(51) Int. Cl.
*H04W 12/04* (2009.01)
*H04W 12/06* (2009.01)

(52) U.S. Cl.
CPC ......... *H04L 63/0892* (2013.01); *H04W 12/04* (2013.01); *H04W 12/06* (2013.01); *H04L 63/18* (2013.01)

(56) References Cited

U.S. PATENT DOCUMENTS

| | | | | |
|---|---|---|---|---|
| 7,565,546 | B2* | 7/2009 | Candelore | H04N 7/163 380/200 |
| 7,831,827 | B2* | 11/2010 | Walmsley | B41J 2/04505 380/2 |
| 7,848,746 | B2* | 12/2010 | Juels | H04L 63/0492 455/424 |
| 7,987,363 | B2* | 7/2011 | Chauncey | H04L 63/0428 380/270 |
| 9,535,852 | B2* | 1/2017 | Adkins | H04L 9/0866 |
| 2004/0193880 | A1* | 9/2004 | Walmsley | B41J 2/04505 713/168 |
| 2006/0036860 | A1* | 2/2006 | Avramopoulos | H04L 9/0841 713/171 |
| 2006/0085635 | A1* | 4/2006 | Park | H04L 63/08 713/159 |
| 2007/0279227 | A1* | 12/2007 | Juels | H04L 63/0492 340/572.1 |
| 2008/0065892 | A1* | 3/2008 | Bailey | H04L 63/0492 713/171 |
| 2008/0127317 | A1* | 5/2008 | Nakhjiri | H04L 63/06 726/6 |
| 2008/0178274 | A1* | 7/2008 | Nakhjiri | H04L 63/06 726/9 |
| 2008/0184341 | A1* | 7/2008 | Sebesta | H04L 63/0807 726/4 |
| 2009/0287922 | A1* | 11/2009 | Herwono | H04L 9/0822 713/155 |
| 2009/0288143 | A1* | 11/2009 | Stebila | G06F 21/445 726/3 |
| 2010/0031036 | A1* | 2/2010 | Chauncey | H04L 63/0428 713/168 |
| 2010/0211685 | A1* | 8/2010 | McDowall | H04L 63/061 709/227 |
| 2013/0232335 | A1* | 9/2013 | King | H04L 63/062 713/155 |
| 2013/0246794 | A1* | 9/2013 | Brown | H04L 9/0844 713/171 |
| 2013/0268771 | A1* | 10/2013 | Blankenbeckler | H04L 9/0866 713/189 |
| 2013/0322622 | A1* | 12/2013 | Bailey | H04L 63/0492 380/44 |
| 2014/0366105 | A1* | 12/2014 | Bradley | H04W 12/08 726/5 |
| 2015/0163669 | A1* | 6/2015 | Holtmanns | H04L 9/0869 726/6 |
| 2015/0295905 | A1* | 10/2015 | Leicher | H04W 12/06 726/4 |
| 2016/0080153 | A1* | 3/2016 | Suzuki | H04L 9/0866 713/194 |
| 2018/0013782 | A1* | 1/2018 | Choyi | H04L 63/0892 |

OTHER PUBLICATIONS

Soriente, Claudio et al., "HAPADEP: Human-Assisted Pure Audio Device Pairing", Proceedings of the 11th International Conference on Information Security, Springer-Verlag, Berlin Heidelberg, 2008, 385-400.

* cited by examiner

ESTABLISHING A SECURE CONNECTION BETWEEN A MASTER DEVICE AND A SLAVE DEVICE

TECHNICAL FIELD

The invention relates to methods of establishing a secure connection between a master device and a slave device which share at least a first communication channel, corresponding computer programs and computer readable storage media, a corresponding master device, a corresponding slave device, and a bootstrapping server for establishing a secure connection between a master device and a slave device which share at least a first communication channel.

BACKGROUND

In recent years, the amount of accessory devices, such as audio/video output devices, which can be connected over wireless interfaces, have steadily increased. Examples for such devices are wireless speakers operating on IEEE 802.11 and the Intel Wireless Display. These audio/video output devices, throughout the present disclosure referred to as slave devices, need to be securely connected to other controlling devices, or parent devices, herein referred to as master devices, such as mobile phones, computers, tablet computers, and so forth.

The solution presented herein arises from the need to easily, yet securely, connect a slave device, such as a wireless speaker or wireless display to a master device, such as a mobile phone, e.g., for the purpose of streaming music or video content to the slave device. Adding additional interfaces to the slave device, such as Near Field Communication (NFC), for the purpose of establishing a secure connection is economically not feasible.

Known mechanisms for establishing trust relationships between two devices suffer from security and/or usability trade-offs. Current mechanisms for secure device pairing typically require significant user interaction, such as pressing buttons simultaneously or listening to confirmation messages on both ends. Although such involvement of the user generally increases security, it hampers usability and flexibility.

Previous work on pairing over out-of-band audio/video channels requires both the master device and the slave device to have microphones and speakers, or cameras and displays, for directly exchanging cryptographic information between the devices to be paired (see, e.g., C. Soriente, G. Tsudik, and E. Uzun, "HAPADEP: human-assisted pure audio device pairing", Proceedings of the 11th international conference on Information Security, Springer-Verlag, 2008, pages 385-400).

SUMMARY

It is an object of the invention to provide an improved alternative to the above techniques and prior art.

More specifically, it is an object of the invention to provide an improved way of establishing a secure connection between a master device and a slave device which share at least a first communication channel. In the present context, establishing a secure connection is to be understood as enabling secure communications between the master device and the slave device over the first communication channel or any other communication channel shared by the master device and the slave device. This process is commonly referred to as bootstrapping.

These and other objects of the invention are achieved by means of different aspects of the invention, as defined by the independent claims. Embodiments of the invention are characterized by the dependent claims.

According to a first aspect of the invention, a method of establishing a secure connection between a master device and a slave device is provided. The master device and the slave device share at least a first communication channel. The method comprises, at the master device, transmitting an identifier $ID_M$ associated with the master device over the first communication channel. The method further comprises, at the slave device, receiving $ID_M$, generating a proof-of-possession $X_S$ of a pre-shared key $K_S$, generating a key $MK_S$, storing $MK_S$, and transmitting a first identifier $ID_{S1}$ associated with the slave device and $X_S$ to the master device. The proof-of-possession $X_S$ is generated using $K_S$, $ID_M$, and $ID_{S1}$. The key $MK_S$ is generated using $ID_M$, $ID_{S1}$, and $K_S$. The method further comprises, at the master device, receiving $ID_{S1}$ and $X_S$, and transmitting $ID_{S1}$, $X_S$, and $ID_M$, to a bootstrapping server. The method further comprises, at the bootstrapping server, receiving $ID_{S1}$, $X_S$, and $ID_M$, acquiring $K_S$, and generating a proof-of-possession $X_B$ of $K_S$. The key $K_S$ is acquired using $ID_{S1}$. The proof-of-possession $X_B$ is generated using $K_S$, $ID_M$, and $ID_{S1}$. The method further comprises, at the bootstrapping server, if $X_B$ and $X_S$ are identical, generating a key $MK_B$ and transmitting $MK_B$ to the master device. The key $MK_B$ is generated using $ID_M$, $ID_{S1}$, and $K_S$. The method further comprises, at the master device, receiving $MK_B$ from the bootstrapping server and storing $MK_B$.

According to a second aspect of the invention, a method of establishing a secure connection between a master device and a slave device is provided. The master device and the slave device share at least a first communication channel. The method is performed by the master device. The method comprises transmitting an identifier $ID_M$ associated with the master device over the first communication channel, receiving a first identifier $ID_{S1}$ associated with the slave device and a proof-of-possession $X_S$ of a pre-shared key $K_S$ from the slave device, transmitting $ID_{S1}$, $X_S$, and $ID_M$, to a bootstrapping server, receiving a key $MK_B$ from the bootstrapping server, and storing $MK_B$.

According to a third aspect of the invention, a method of establishing a secure connection between a master device and a slave device is provided. The master device and the slave device share at least a first communication channel. The method is performed by the slave device. The method comprises receiving an identifier $ID_M$ associated with the master device over the first communication channel, generating a proof-of-possession $X_S$ of a pre-shared key $K_S$, and generating a key $MK_S$. The proof-of-possession $X_S$ is generated using $K_S$, $ID_M$, and a first identifier $ID_{S1}$ associated with the slave device. The key $MK_S$ is generated using $ID_M$, $ID_{S1}$, and $K_S$. The method further comprises storing $MK_S$, and transmitting $ID_{S1}$ and $X_S$ to the master device.

According to a fourth aspect of the invention, a method of establishing a secure connection between a master device and a slave device is provided. The master device and the slave device share at least a first communication channel. The method is performed by a bootstrapping server. The method comprises receiving a first identifier $ID_{S1}$ associated with the slave device, a proof-of-possession $X_S$ of a pre-shared key $K_S$, and an identifier $ID_M$ associated with the master device, from the master device. The method further comprises acquiring $K_S$, and generating a proof-of-possession $X_B$ of $K_S$. The key $K_S$ is acquired using $ID_{S1}$. The proof-of-possession $X_B$ is generated using $K_S$, $ID_M$, and $ID_{S1}$. The method further comprises, if $X_B$ and $X_S$ are identical, generating a key $MK_B$, and transmitting $MK_B$ to the master device. The key $MK_B$ is generated using $ID_M$, $ID_{S1}$, and $K_S$.

According to a fifth aspect of the invention, a master device for establishing a secure connection with a slave device is provided. The master device and the slave device share at least a first communication channel. The master device comprises means which are adapted to transmit an identifier $ID_M$ associated with the master device over the first communication channel, receive a first identifier $ID_{S1}$ associated with the slave device and a proof-of-possession $X_S$ of a pre-shared key $K_S$ from the slave device, transmit $ID_{S1}$, $X_S$, and $ID_M$, to a bootstrapping server, receive a key $MK_B$ from the bootstrapping server, and store $MK_B$.

According to a sixth aspect of the invention, a slave device for establishing a secure connection with a master device is provided. The master device and the slave device share at least a first communication channel. The slave device comprises means which are adapted to receive an identifier $ID_M$ associated with the master device over the first communication channel, generate a proof-of-possession $X_S$ of a pre-shared key $K_S$, and generate a key $MK_S$. The proof-of-possession $X_S$ is generated using $K_S$, $ID_M$, and a first identifier $ID_{S1}$ associated with the slave device. The key $MK_S$ is generated using $ID_M$, $ID_{S1}$, and $K_S$. The means are further adapted to store $MK_S$, and transmit $ID_{S1}$ and $X_S$ to the master device.

According to a seventh aspect of the invention, a bootstrapping server for establishing a secure connection between a master device and a slave device is provided. The master device and the slave device share at least a first communication channel. The bootstrapping server comprises means which are adapted to receive a first identifier $ID_{S1}$ associated with the slave device, a proof-of-possession $X_S$ of a pre-shared key $K_S$, and an identifier $ID_M$ associated with the master device, from the master device. The means are further adapted to acquire $K_S$, and generate a proof-of-possession $X_B$ of $K_S$ using $ID_M$ and $ID_{S1}$. The key $K_S$ is acquired using $ID_{S1}$. The proof-of-possession $X_B$ is generated using $K_S$, $ID_M$, and $ID_{S1}$. The means are further adapted to, if $X_B$ and $X_S$ are identical, generate a key $MK_B$, and transmit $MK_B$ to the master device. The key $MK_B$ is generated using $ID_M$, $ID_{S1}$, and $K_S$.

According to further aspects of the invention, computer programs comprising instructions are provided. The instructions are adapted, if executed on at least one processor, to implement embodiments of the methods according to any one of the first, second, third, or fourth, aspect of the invention.

According to even further aspects of the invention, computer readable storage media are provided. The computer readable storage media have stored thereon the computer programs according to the corresponding aspects of the invention.

The solution disclosed here provides a generic bootstrapping mechanism between two devices sharing at least one communication channel, wired or wireless, such as Ethernet, Wireless Local Area Network (WLAN)/WiFi, Bluetooth, a cellular mobile network, or the like.

The invention is advantageous in that it provides a bootstrapping mechanism for a pair of devices, throughout this disclosure referred to as master device and slave device, which do not have any prior knowledge of each other. Furthermore, it eliminates the need for providing the master device and/or slave device with additional communication interfaces. The presented solution relies on a bootstrapping server which may be operated by a manufacturer of the slave device. Alternatively, the bootstrapping server may be operated by a third part on behalf of one or more device manufacturers.

The disclosed solution is based on a pre-shared secret, the key $K_S$ (the index "S" referring to the slave device), which is known to the slave device and the bootstrapping server. The key $K_S$ is preferably pre-configured at the slave device, e.g., as part of the manufacturing process, and a copy of the key $K_S$ is provided to the bootstrapping server. Preferably, the key $K_S$ is unique, i.e., each slave device is associated with a different key. A proof-of-possession $X_S$ of the pre-shared key $K_S$ is generated at the slave device, using the pre-shared key $K_S$, the identifier $ID_M$ (the index "M" referring to the master device) of the master device, and the first identifier $ID_{S1}$ of the slave device. $ID_{S1}$ is used for identifying the slave device to the bootstrapping server, and in particular for identifying the pre-shared key $K_S$ which is associated with the slave device. The proof-of-possession may, e.g., be a keyed hash, as is known in the art. Further, the slave device generates a session key, here referred to as master key $MK_S$. The master key may be generated as a regular hash using $ID_M$, $ID_{S1}$, and $K_S$. Subsequently, the proof-of-possession $X_S$ is transmitted to the master device and further to the bootstrapping server, together with $ID_M$ and $ID_{S1}$. The bootstrapping server acquires the pre-shared key $K_S$ which is associated with the slave device, e.g., from a local database or from the manufacturer of the slave device, and generates a proof-of-possession $X_B$ using the same algorithm as the slave device. The proof-of-possession $X_B$, generated at the bootstrapping server, is used to verify whether the proof-of-possession $X_S$, generated by the slave device, has been generated with the correct credentials, e.g., credentials which were provided to the slave device during the manufacturing process. Thereby, the identity of the slave device can be verified.

If $X_S$ and $X_B$ are identical, the bootstrapping server has verified the identity of the slave device and generates a master key $MK_B$, using the same algorithm as the slave device, and transmits it to the master device. As a result of the bootstrapping process, the master device and the slave device are in possession of a shared secret, i.e., identical master keys $MK_B$ and $MK_S$, respectively, which subsequently may be used for communicating in a secure way. The established secure communication session may subsequently be used for establishing additional trust relationship and security associations.

According to an embodiment of the invention, the master device and the slave device share a second communication channel which is different from the first communication channel. $ID_{S1}$ and $X_S$ are transmitted from the slave device to the master device over the second communication channel. The second communication channel may, e.g., be an out-of-band channel, and in particular a location limited channel, i.e., a channel having a limited range, such as audio, video, or light. This is advantageous in that security is increased, in particular if the second communication channel is short ranged. Thereby, the risk for eavesdropping and man-in-the-middle attacks is reduced. This is the case since an attacker has to be in the vicinity of the slave device in order to receive $ID_{S1}$ and $X_S$. As an alternative, $ID_{S1}$ and $X_S$ are transmitted over the first communication channel.

According to an embodiment of the invention, $ID_{S1}$ and $X_S$ are encoded, at the slave device, into a representation which is suitable for transmission over the second communication channel. Further, $ID_{S1}$ and $X_S$ are extracted, at the bootstrapping server, from the encoded representation. This may be achieved by decoding the encoded representation. At the slave device, the transmitting $ID_{S1}$ and $X_S$ to the master device comprises transmitting the encoded representation to the master device. At the master device, the receiving $ID_{S1}$ and $X_S$ comprises receiving the encoded representation, and the transmitting $ID_{S1}$, $X_S$, and $ID_M$, to the bootstrapping server comprises transmitting the encoded representation and $ID_M$ to the bootstrapping server. At the bootstrapping server, the receiving $ID_{S1}$, $X_S$, and $ID_M$, comprises receiving the encoded representation and $ID_M$. Optionally, the extracting $ID_{S1}$ and $X_S$ may be performed at the master device, and the extracted $ID_{S1}$ and $X_S$ are transmitted to the bootstrapping server.

According to an embodiment of the invention, the encoded representation is audible sound. The transmitting the encoded representation at the slave device comprises emitting the sound. The receiving the encoded representation at the master device comprises recording the sound. That is, the slave device comprises means for emitting audible sound, such as a loudspeaker, and the master device comprises means for recording sound, such as a microphone. For instance, the slave device may be a loudspeaker which can be wirelessly connected, e.g., using WLAN, to a computer or a mobile phone for streaming audio, such as music. As a further example, the slave device may be a mobile phone which can be wirelessly connected to a computer. This is advantageous in that existing interfaces, such as loudspeaker and microphone, may be used for the purpose of bootstrapping. Further, transmitting $ID_{S1}$ and $X_S$ over the second communication channel, which is location limited, reduces the risk for eavesdropping. To this end, $ID_{S1}$ and $X_S$ are encoded into audible sound which is emitted by the slave device and recorded by the master device. The recorded sound is either transmitted to the bootstrapping server, where $ID_{S1}$ and $X_S$ are extracted by decoding the sound, or decoded at the master device.

According to an embodiment of the invention, the encoded representation is an image. The transmitting the encoded representation at the slave device comprises displaying the image. The receiving the encoded representation at the master device comprises capturing the image. The image may be a still image or a video, i.e., a sequence of images. For instance, the image may be a barcode or a QR code. To this end, the slave device comprises means for displaying an image, such as a display or screen, and the master device comprises means for capturing an image, such as a digital camera. For instance, the slave device may be a television or a display which can be wirelessly connected, e.g., using WLAN, to a computer or a mobile phone for streaming video. As a further example, the slave device may be a mobile phone which can be wirelessly connected to a computer. This is advantageous in that existing interfaces, such as display and camera, may be used for the purpose of bootstrapping. Further, transmitting $ID_{S1}$ and $X_S$ over the second communication channel, which is location limited, reduces the risk for eavesdropping. To this end, $ID_{S1}$ and $X_S$ are encoded into an image which is displayed by the slave device and captured by the master device. The image is either transmitted to the bootstrapping server, where $ID_{S1}$ and $X_S$ are extracted by decoding the image, or decoded at the master device.

According to an embodiment of the invention, a nonce N is generated at the slave device. The nonce may, e.g., be a time stamp or generated randomly, as is known in the art. Further, at the slave device, N is used in generating $X_S$ and $MK_S$ and transmitted to the master device. At the master device, N is received and transmitted to the bootstrapping server. At the bootstrapping server, N is used in generating $X_B$ and $MK_B$. If a nonce is used, different results for $X_S$ and $MK_S$ are obtained every time the bootstrapping process is initiated. Using a nonce in the bootstrapping procedure is advantageous in that the risk for replay attacks is reduced. Optionally, the nonce may be generated at the master device and transmitted to the slave device, together with $ID_M$.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, embodiments of the invention are described with reference to FIG. 1, which illustrates a system 100 comprising a master device 101 and a slave device 102 which share a first communication channel 104. For instance, the master device 101 may be a mobile phone and the slave device 102 may be a loudspeaker capable of receiving streamed audio over a wireless connection 104 from the mobile phone 101. The wireless connection 104 may, e.g., be WiFi or Bluetooth. As a further example, the master device 101 may be a computer capable of streaming video over a wireless connection 104, such as WiFi or Bluetooth, to a television 102. The system 100 further comprises a bootstrapping server 103, which communicates with the master device over a communications network 106, such as the Internet, a Local Area Network (LAN), a cellular mobile network, e.g., Global System for Mobile Communications (GSM), Universal Mobile Telecommunications System (UMTS), or Long Term Evolution (LTE), or a combination thereof.

Figure 1:
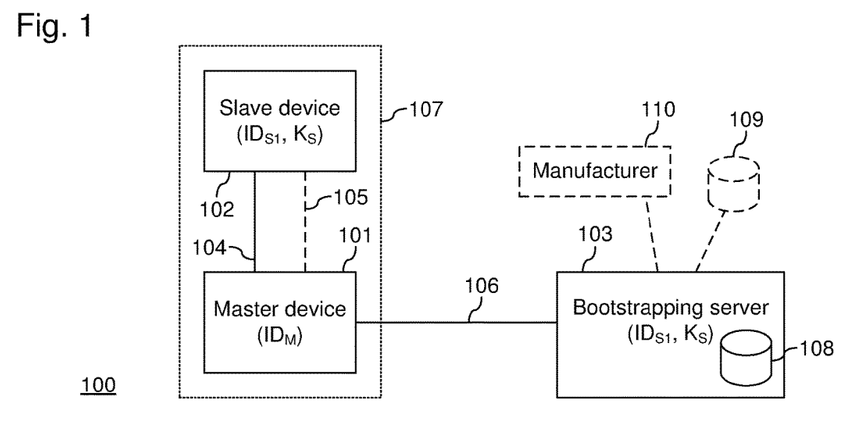
FIG. 1 illustrates a system in accordance with an embodiment of the invention.

FIG. 1 further illustrates which credentials the different entities are provided with. The master device 101 is in possession of an identifier $ID_M$ which is associated with the master device 101. $ID_M$ is preferably unique and may, e.g., be a medium Access Control (MAC) address of the master device 101, a serial number of the master device 101, or a Service Set IDentification (SSID) in case the master device 101 is a WLAN access point or a smartphone in tethering mode, providing a personal WLAN hotspot. $ID_M$ may also be a public key or a hash of a public key, thereby enabling the master device 101 to prove its identity to the bootstrapping server 103. The slave device 102 is in possession of a first identifier $ID_{S1}$ associated with the slave device and a pre-shared key $K_S$ which is associated with the slave device 102. $ID_{S1}$ is preferably unique and may, e.g., be a serial number of the slave device 102, a MAC address of the slave device 102, or some other arbitrary identifier provided during the manufacturing process. $ID_{S1}$ is used for identifying the slave device 102 to the bootstrapping server 103, and in particular for identifying the pre-shared key $K_S$ which is associated with the slave device 102, as is described further below. The key $K_S$ is a pre-shared secret which is preferably provided during the manufacturing process, i.e., is pre-configured. It is known to the slave device 101 and the bootstrapping server 103 only. $K_S$ is preferably unique, i.e., different slave devices are associated with different keys.

Figure 2:
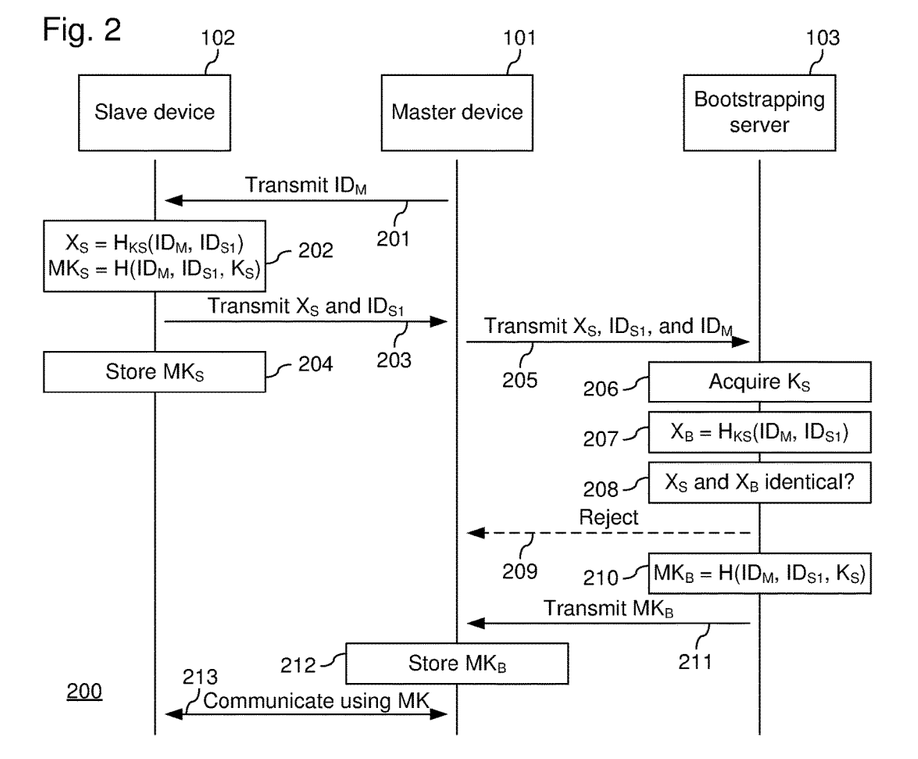
FIG. 2 illustrates a bootstrapping process, in accordance with an embodiment of the invention.

With reference to FIG. 2, a bootstrapping process, i.e., a method 200 of establishing a secure connection between the master device 101 and the slave device 102 is now described.

First, the master device 101 transmits 201 its identifier $ID_M$ over the first communication channel 104, such as WiFi or Bluetooth, to the slave device 102. If the master device 101 is a WLAN access point, or a smartphone in tethering mode, the SSID which it regularly transmits may constitute such an identifier $ID_M$. The slave device 102, in response to receiving 201 $ID_M$, generates 202 a proof-of-possession $X_S$ of the pre-shared key $K_S$, using $K_S$, $ID_M$, and the first identifier $ID_{S1}$ of the slave device 102. $X_S$ may, e.g., be a calculated as a keyed hash, i.e., $H_{KS}(ID_M, ID_{S1})$. A keyed hash, also known in the art as message authentication code, is a piece of information which is used for authenticating a message and for providing integrity and authenticity assurances. An integrity assurance detects accidental and intentional message changes, while an authenticity assurance affirms the message's origin, in this case the slave device 102. Then, the slave device 102 generates 202 a key $MK_S$ using $ID_M$, $ID_{S1}$, and $K_S$. $MK_S$ may be calculated as a regular hash, e.g., $H(ID_M, ID_{S1}, K_S)$. The slave device 102 transmits 203 $ID_{S1}$ and $X_S$ to the master device 101 and stores 204 the master key $MK_S$, e.g., in a local storage such as a memory. After the bootstrapping process is completed, $MK_S$ constitutes a shared secret, commonly known as the master key or session key, which may be used for securely communicating with the master device 101. $ID_{S1}$ and $X_S$ may be transmitted 203 over the first communication channel 104 or over any additional communication channel 105 which is shared by the master device 101 and the slave device 102, as is described further below.

Optionally, the slave device 102 may transmit information pertaining to which bootstrapping server 103 to use to the master device 101. For instance, the slave device 102 may transmit, preferably together with $ID_{S1}$ and $X_S$, a Uniform Resource Locator (URL) or an Internet Protocol (IP) address of the bootstrapping server 103.

The master device 101, in response to receiving 203 $ID_{S1}$ and $X_S$, transmits 205 $ID_{S1}$, $X_S$, and $ID_M$ to the bootstrapping server 103. $ID_{S1}$, $X_S$, and $ID_M$ may be transmitted 205 over a communications network 106, such as the Internet. Optionally, the bootstrapping server 103 may be identified based on information received from the slave device 102. For instance, the master device 101 may utilize an URL or an IP address received from the slave device 102 for transmitting 205 $ID_{S1}$, $X_S$, and $ID_M$ to the bootstrapping server 103. The communication between the master device 101 and the bootstrapping server 103 may be secured, e.g., using Transport Layer Security (TLS) or IPSec.

At the bootstrapping server 103, in response to receiving 205 $ID_{S1}$, $X_S$, and $ID_M$, a copy of the pre-shared key $K_S$ is acquired 206 using $ID_{S1}$. To this end, $ID_{S1}$ is used to identify the correct key $K_S$ which is associated with the slave device 102. For instance, $K_S$ may be retrieved 206 from a local storage or database 108 of the bootstrapping server 103. Alternatively, $K_S$ may be requested 206 from an external database 109, which may, e.g., be operated by one or more device manufacturers or by a third party on behalf of one or more device manufacturers. As yet a further alternative, $K_S$ may be requested 206 from a manufacturer 110 of the slave device 102, e.g., from a bootstrapping portal 110 which is provided by the manufacturer.

Then, the bootstrapping server 103 generates 207 a proof-of-possession $X_B$ of $K_S$ using $K_S$ and the received 205 $ID_M$ and $ID_{S1}$. In generating 207 $X_B$, the same algorithm which was used for generating 202 $X_S$ at the slave device 102 is used. In the present example, $X_B$ is calculated 207 as a keyed hash $H_{KS}(ID_M, ID_{S1})$. Then, it is evaluated 208 if $X_B$ and $X_S$ are identical. If $X_B$ and $X_S$ are identical 208, a master key $MK_B$ is generated 210 using $ID_M$, $ID_{S1}$, and $K_S$, and transmitted 211 to the master device 102 where it is received 211 and stored 212, e.g., in a local storage such as a memory. The master key $MK_B$ is generated 210 using the same algorithm which was used for generating $MK_S$ 202 at the slave device 102. In the present example, $MK_B$ is calculated 210 as a regular hash $H(ID_M, ID_{S1}, K_S)$. In case $X_B$ and $X_S$ are not identical 208, e.g., because the slave device 101 is not in possession of the correct key $K_S$ but has generated 202 the proof-of-possession $X_S$ with a key $K_S'$ which is not known to the bootstrapping server 103, or not associated with the slave device 102, the master key $MK_B$ need not to be generated and transmitted to the master device 101. Optionally, the bootstrapping server 103 may notify 209 the master device 101 that the bootstrapping process has failed and the pairing request is rejected.

As a result of the process described hereinbefore, the master device 101 and the slave device 102 are in possession of a shared secret, i.e., identical shared keys $MK_S$ and $MK_B$, which they may use for securely communicating 213 over the first communication channel 104 or any other communication channel 105.

In a scenario where the master device 101 and the slave device 102 share an additional, second, communication channel 105 with each other, $ID_{S1}$ and $X_S$ may be transmitted 203 from the slave device 102 to the master device 101 over the second communication channel 105. The second communication channel 105 may be an out-of-band channel. In particular, it may be a location limited channel 105, such as audio, video, or light. Using a short-ranged second communication channel 105 is advantageous in that it hampers eavesdropping. Such a location 107 is illustrated in FIG. 1 and may, e.g., be a room in which both the master device 101 and the slave device 102 are located. Whereas radio frequency based technologies, such WiFi and Bluetooth (the first communication channel 104 of the present example), have a range which may extend beyond the room 107 in which both devices 101 and 102 are located, a location limited second communication channel 105 may not be receivable outside the room 107. For instance, this is the case if audible sound or images are used for transmitting 203 $X_S$ and $ID_{S1}$ from the slave device 102 to the master device 101. If a location-limited channel 105 is used, an attacker attempting to pair his/her master device with the slave device 102 must be in the vicinity of the slave device 102, i.e., in the same room 107 as the slave device 102, in order to receive $ID_{S1}$ and $X_S$. If no additional communication channel is available, all communication between the master device 101 and the slave device 102 commences over the first communication channel 104.

If a second communication channel 105 is used, the slave device 102 encodes $ID_{S1}$ and $X_S$ into a representation which is suitable for transmission over the second communication channel 105 before $ID_{S1}$ and $X_S$ are transmitted 203. Correspondingly, $ID_{S1}$ and $X_S$ are transmitted from the slave device 102 to the master device 101, and further 205 to the bootstrapping server 103, as the encoded representation. At the bootstrapping server 103, $ID_{S1}$ and $X_S$ are extracted by decoding the encoded representation. Optionally, the decoding may be performed at the master device 102 which transmits 205 $ID_{S1}$ and $X_S$ without encoding them into a representation which is suitable for transmission over the second communication channel 105.

Figure 3:
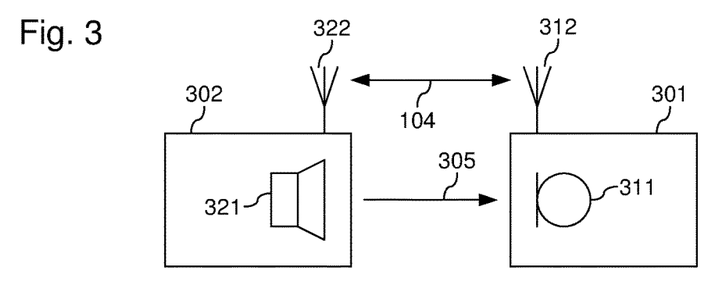
FIG. 3 shows a master device and a slave device using audible sound as a second communication channel, in accordance with an embodiment of the invention.

With reference to FIG. 3, an embodiment of the invention utilizing audible sound 305 as a second communication channel 105 is now described. In FIG. 3, an embodiment 301 of the master device 101 comprises means 311 for recording audible sound, here illustrated as microphone 311, in addition to means 312 for communicating wirelessly over the first communication channel 104. Further, an embodiment 302 of the slave device 102 comprises means 321 for emitting audible sound, here illustrated as loudspeaker 321. For instance, the master device 301 may be a mobile phone and the slave device 302 may be a loudspeaker which is equipped with a wireless interface 322, such as WiFi or Bluetooth. In the present example, the master device 301 transmits 201 $ID_M$ over the first communication channel 104. Then, the slave device 302 generates 202 $X_S$, encodes $ID_{S1}$ and $X_S$ into audible sound, and emits the sound. The slave device 302 records the sound emitted by the master device 301. In this case, transmission 201 over the second communication channel 105 constitutes transmission of sound waves 305 from the slave device 302 to the master device 301. For the sake of clarity, the bootstrapping server 103 is omitted in FIG. 3. An embodiment of the invention utilizing sound 305 as a second communication channel 105 is advantageous in that the risk for eavesdropping is reduced. Typically, this is the case when the master device 301 and the slave device 302 are located in close proximity, e.g., within the same room 107, thereby confining the range of the sound waves 305 emitted by the slave device 302.

Figure 4:
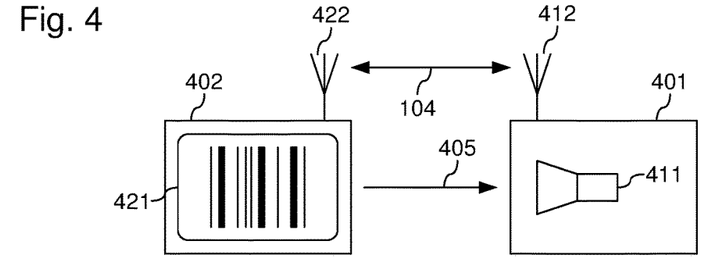
FIG. 4 shows a master device and a slave device using images as a second communication channel, in accordance with an embodiment of the invention.

With reference to FIG. 4, an embodiment of the invention utilizing images 405, i.e., visual information, as a second communication channel 105 is now described. In FIG. 4, an embodiment 401 of master device 101 comprises means 411 for capturing images, here illustrated as camera 411, in addition to means 412 for communicating wirelessly over the first communication channel 104. Further, an embodiment 402 of slave device 102 comprises means 421 for displaying images, here illustrated as display 421. For instance, the master device 401 may be a computer and the slave device 402 may be a television which is equipped with a wireless interface 422, such as WiFi or Bluetooth. In the present example, the master device 401 transmits 201 $ID_M$ over the first communication channel 104. Then, the slave device 402 generates 202 $X_S$, encodes $ID_{S1}$ and $X_S$ into an image, here illustrated as a barcode, and displays the image. The slave device 402 captures the image displayed by the master device 401. In this case, transmission 201 over the second communication channel 105 constitutes transmission of visual information 405, such as images, from the slave device 402 to the master device 401. For the sake of clarity, the bootstrapping server 103 is omitted in FIG. 4. An embodiment of the invention utilizing images or other types of visual information 405 as a second communication channel 105 is advantageous in that the risk for eavesdropping is reduced. Typically, this is the case when the master device 401 and the slave device 402 are located in close proximity, e.g., within the same room 107, thereby confining the range of the visual information 405 displayed by the slave device 302.

Other types of visual information 405 may, e.g., be light or video. For instance, $ID_{S1}$ and $X_S$ may be encoded into visible light, as is known in the art, and emitted by the slave device 102 using a Light Emitting Diode (LED), a screen, a display, or the like, and detected by the master device 101 using a camera or a light sensor.

The bootstrapping process described herein can further be improved by using a nonce. To this end, a nonce N is generated at the slave device 102, e.g., as a time stamp, randomly, or pseudo-randomly. N is then used in generating 202 $X_S$ and $MK_S$ at the slave device 102 and is transmitted 203, together with $X_S$ and $ID_{S1}$, to the master device 101 and further 205 to the bootstrapping server 103. At the bootstrapping server 103, N is used in generating 207 $X_B$, and if $X_S$ and $X_B$ are identical 208, in generating 210 $MK_B$. For instance, $X_S$ and $X_B$ may be generated as $H_{KS}(ID_M, ID_{S1}, N)$, and $MK_S$ and $MK_B$ may be generated as $H(ID_M, ID_{S1}, K_S, N)$. If a second communication channel 105 is used for transmitting 203 $X_S$ and $ID_{S1}$, N may be encoded into the same representation which is suitable for transmission over the second communication channel 105 as $X_S$ and $ID_{S1}$. As an alternative, the nonce may be generated at the master device 101 and transmitted 201 to the slave device 102, together with $ID_M$, and transmitted 205 to the bootstrapping server 103. Using a nonce is advantageous in that replay attacks may be avoided. This is the case since $X_S$ and $MK_S$, which are re-generated every time the bootstrapping process is initiated, will be different since a new nonce is used as input for the calculation. If a nonce is not used, the resulting $X_S$ and $MK_S$ are identical every time they are re-generated. Corresponding reasoning applies to $X_B$ and $MK_B$.

As a further improvement, embodiments of the invention may optionally utilize a second identifier $ID_{S2}$ associated with the slave device 102. $ID_{S2}$ can be used in generating 202 $X_S$ and $MK_S$ at the slave device 102, and in generating 207 $X_B$ and 210 $MK_B$ at the bootstrapping server 103. For instance, $X_S$ and $X_B$ may be generated as $H_{KS}(ID_M, ID_{S1}, ID_{S2}, N)$, and $MK_S$ and $MK_B$ may be generated as $H(ID_M, ID_{S1}, ID_{S2}, K_S, N)$. To this end, $ID_{S2}$ is an additional shared secret only known to the slave device 102 and the bootstrapping server 103. In contrast to the first identifier $ID_{S1}$, the second identifier $ID_{S2}$ is not transmitted to the master device 101 and further to the bootstrapping server 103, and is therefore not exposed to eavesdroppers. Rather, the bootstrapping server 103 acquires $ID_{S2}$ in a similar way as it acquires 206 $K_S$. Using a second identifier is advantageous in that a potential attacker will not know the input to the hash function, making it thereby harder to perform a brute force attack.

Embodiments of the invention are advantageous in comparison with the prior art, in particular Kerberos, in that they do not require a trust relationship and/or a shared secret between the bootstrapping server and the master device. In Kerberos, e.g., both the master device and the slave device need to share secrets with the bootstrapping server. Contrary to Kerberos, embodiments of the invention are based on shared secrets known only to the slave device and the bootstrapping service, while the master device merely proves that it is in the vicinity of the slave device. As a further advantage, the bootstrapping process may be re-initiated, e.g., by providing a reset button.

Figure 5:
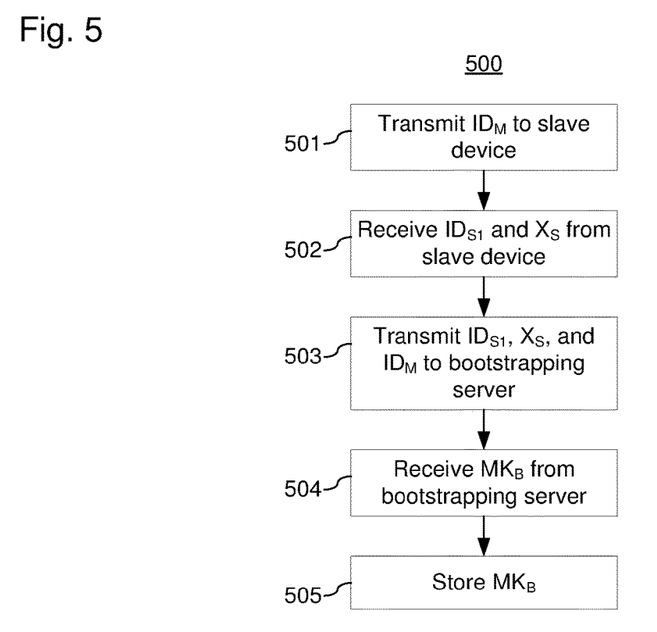
FIG. 5 shows a method of establishing a secure connection between a master device and a slave device, the method being performed by the master device, in accordance with an embodiment of the invention.

In the following, an embodiment of the method of establishing a secure connection between the master device 101 and the slave device 102, which share at least the first communication channel 104, is described with reference to FIG. 5. The method 500 is performed by the master device 101 and comprises transmitting 501 $ID_M$ over the first communication channel 104, i.e., to the slave device 102, receiving 502 $ID_{S1}$ and $X_S$ from the slave device 102, transmitting 503 $ID_{S1}$, $X_S$, and $ID_M$ to the bootstrapping server 103, receiving 504 $MK_B$ from the bootstrapping server 103, and storing 505 $MK_B$. $X_S$ is a proof-of-possession of the pre-shared key $K_S$ which is available to the slave device 102 and the bootstrapping server 103.

Optionally, the master device 101 and the slave device 102 may share a second communication channel 105 different from the first communication channel 104, and $ID_{S1}$ and $X_S$ are received 502 from the slave device 102 over the second communication channel 105. Further, $ID_{S1}$ and $X_S$ may be received 502 as an encoded representation which is suitable for transmission over the second communication channel 105. The encoded representation may either be transmitted 503, together with $ID_M$, to the bootstrapping server 103 or decoded at the master device 101, whereupon the extracted $ID_{S1}$ and $X_S$ are transmitted 503 to the bootstrapping server 103, together with $ID_M$. For instance, the encoded representation may be audible sound, and the encoded representation is received 502 by recording the sound, e.g., using a microphone which the master device 101 is provided with (e.g., master device 301 described with reference to FIG. 3). Alternatively, the encoded representation may be an image, and the encoded representation is received 502 by capturing the image, e.g., using a camera which the master device 101 is provided with (e.g., master device 401 described with reference to FIG. 4).

Figure 6:
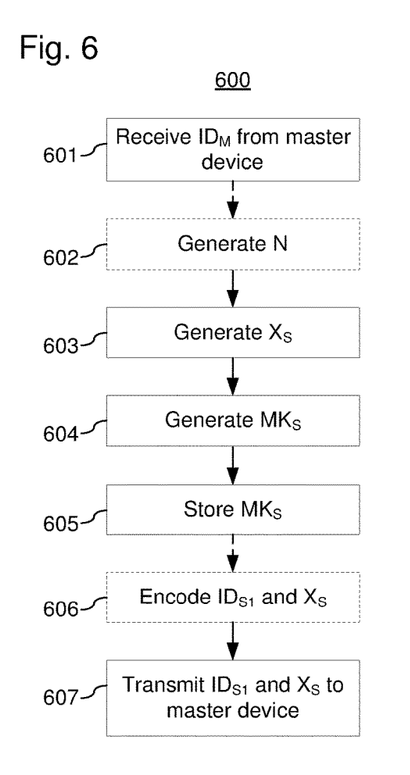
FIG. 6 shows a method of establishing a secure connection between a master device and a slave device, the method being performed by the slave device, in accordance with an embodiment of the invention.

Now, an embodiment of the method of establishing a secure connection between the master device 101 and the slave device 102, which share at least the first communication channel 104, is described with reference to FIG. 6. The method 600 is performed by the slave device 102 and comprises receiving 601 $ID_M$ from the master device 101 over the first communication channel 104, generating 603 $X_S$, generating 604 $MK_S$, storing 605 $MK_S$, and transmitting 607 $ID_{S1}$ and $X_S$ to the master device 101. $X_S$ is a proof-of-possession of the pre-shared key $K_S$ and is calculated using $K^S$, $ID_M$, and first identifier $ID_{S1}$. $MK_S$ is calculated using $ID_M$, $ID_{S1}$, and $K_S$.

Optionally, the master device 101 and the slave device 102 share a second communication channel 105 different from the first communication channel 104, and $ID_{S1}$ and $X_S$ are transmitted 607 from the slave device 102 to the master device 101 over the second communication channel 105. The method 600 may further comprise encoding 606 $ID_{S1}$ and $X_S$ into a representation which is suitable for transmission over the second communication channel 105. To this end, $ID_{S1}$ and $X_S$ are transmitted 607 to the master device 101 as part of the encoded representation. For instance, if the encoded representation is audible sound, the encoded representation is transmitted 607 by emitting the sound, e.g., using a loudspeaker which the slave device 101 is provided with (e.g., slave device 302 described with reference to FIG. 3). Alternatively, if the encoded representation is an image, the encoded representation is transmitted 607 by displaying the image, e.g., using a screen or display which the slave device 102 is provided with (e.g., slave device 402 described with reference to FIG. 4).

As yet another option, the method 600 may further comprise generating 602 a nonce N, using N in generating 603 $X_S$ and 604 $MK_S$, and transmitting 607 N to the master device 101.

Figure 7:
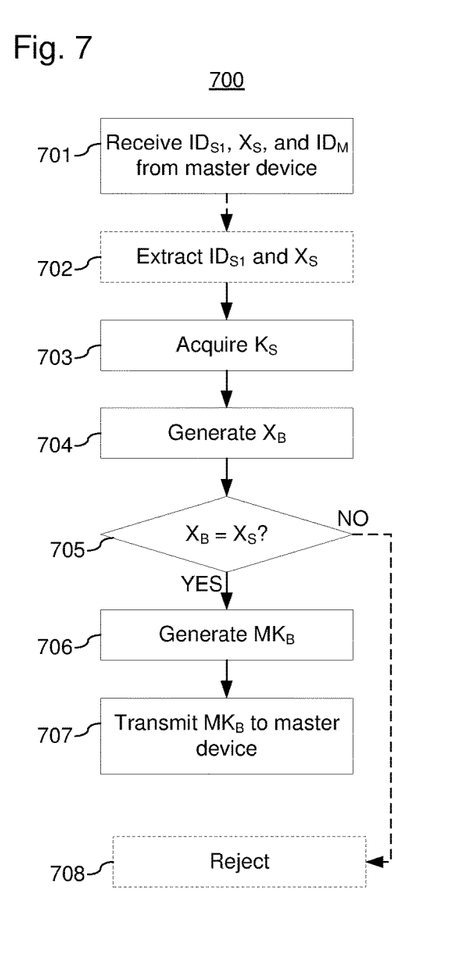
FIG. 7 shows a method of establishing a secure connection between a master device and a slave device, the method being performed by a bootstrapping server, in accordance with an embodiment of the invention.

With reference to FIG. 7, an embodiment of the method of establishing a secure connection between the master device 101 and the slave device 102, which share at least the first communication channel 104, is described. The method 700 is performed by the bootstrapping server 103 and comprises receiving 701 $ID_{S1}$, $X_S$ and $ID_M$, from the master device 101, acquiring 703 $K_S$ using $ID_{S1}$, generating 704 $X_B$, and, if $X_B$ and $X_S$ are identical 705, generating 706 $MK_B$ and transmitting 707 $MK_B$ to the master device 101. $X_S$ and $X_B$ are proof-of-possession of the pre-shared key $K_S$ which is available to the slave device 102 and the bootstrapping server 103. $MK_B$ is calculated 706 using $ID_M$, $ID_{S1}$, and $K_S$.

Optionally, the master device 101 and the slave device 102 share a second communication channel 105 different from the first communication channel 104, and $ID_{S1}$ and $X_S$ are received 701 as an encoded representation which is suitable for transmission over the second communication channel 105, together with $ID_M$. In this case, the method 600 method further comprises extracting 702 $ID_{S1}$ and $X_S$ from the encoded representation, e.g., be decoding the encoded representation. For instance, the encoded representation may be audible sound. Alternatively, the encoded representation may be an image.

As yet another option, the method may further comprise receiving a nonce N from the master device 101, e.g., together with $ID_{S1}$, $X_S$ and $ID_M$, and using N in generating 704 $X_B$ and 705 $MK_B$.

Embodiments of the methods 500, 600, and 700, may comprise further steps in accordance with what was described hereinbefore, in particular with reference to FIGS. 1 to 4.

Figure 8:
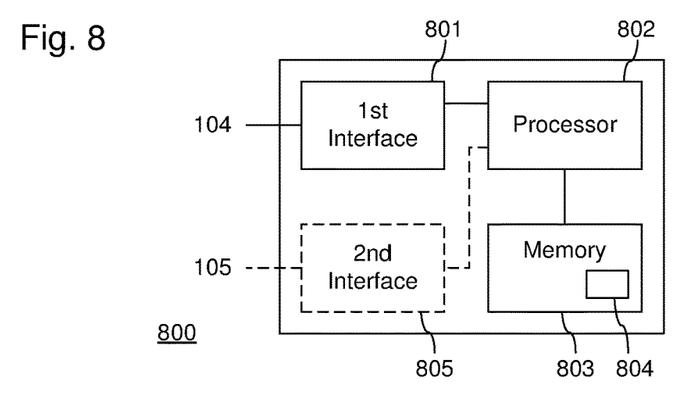
FIG. 8 shows a master device for establishing a secure connection with a slave device, in accordance with an embodiment of the invention.

With reference to FIG. 8, an embodiment of the master device 101 for establishing a secure connection with a slave device 102, the master device 101 and the slave device 102 sharing at least a first communication channel 104, is described in the following. The master device 800 comprises a first communication interface 801, being adapted for communicating over the first communication channel 104, and a processing means such as a processor 802 and a memory 803. The first communication interface 801 may, e.g., be a WLAN or Bluetooth interface. The memory 803 comprises instructions 804 executable by the processor 802, whereby the master device 800 is operative to transmit an identifier $ID_M$ associated with the master device 800 over the first communication channel 104, receive a first identifier $ID_{S1}$ associated with the slave device 102 and a proof-of-possession $X_S$ of a pre-shared key $K_S$ from the slave device 102, transmit $ID_{S1}$, $X_S$, and $ID_M$, to the bootstrapping server 103, receive a key $MK_B$ from the bootstrapping server 103, and store $MK_B$. $MK_B$ may be stored in the memory 803. The master device 800 is operative to transmit $ID_M$, and receive $ID_{S1}$ and $X_S$, via the first communication interface 801. Optionally, if the master device 800 comprises an additional second communication interface 805 being adapted for communicating over a second communication channel 105 which is different from the first communication channel 104, the master device 800 may further be operative to receive $ID_{S1}$ and $X_S$ via the second communication interface 805. The master device 800 is further operative to transmit $ID_{S1}$, $X_S$, and $ID_M$ to, and receive $MK_B$ from, the bootstrapping server 103 via the first communication interface 801 or an additional communication interface (not shown in FIG. 8) which the master device 800 is provided with and which is adapted for communicating via LAN, WLAN, GSM, UMTS, LTE, or the like.

If the master device 800 comprises a second communication interface 805, the master device 800 may further be operative to receive $ID_{S1}$ and $X_S$ via the second communication interface 805 by receiving an encoded representation which is suitable for transmission over the second communication channel 105. In this case, the master device 800 may further be operative to transmit $ID_{S1}$, $X_S$, and $ID_M$, to the bootstrapping server 103 by transmitting the encoded representation and $ID_M$ to the bootstrapping server 103. The encoded representation may be audible sound, and the second communication interface 805 may be adapted to receive the encoded representation by recording the sound. For instance, the second communication interface 805 may comprise a microphone, as is described with reference to FIG. 3. As an alternative, the encoded representation may be an image, and the second communication interface 805 may be adapted to receive the encoded representation by capturing the image. In this case, the second communication interface 805 may comprise a digital camera, as is described with reference to FIG. 4.

Figure 9:
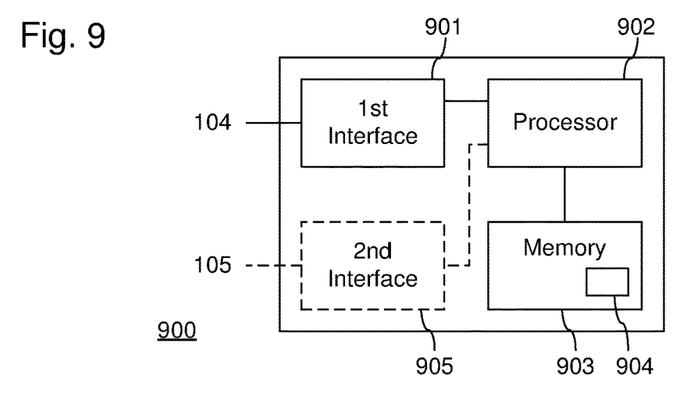
FIG. 9 shows a slave device for establishing a secure connection with a master device, in accordance with an embodiment of the invention.

With reference to FIG. 9, an embodiment of the slave device 102 for establishing a secure connection with a master device 101, the master 101 device and the slave device 102 sharing at least a first communication channel 104, is described in the following. The slave device 900 comprises a first communication interface 901, being adapted for communicating over the first communication channel 104, and a processing means such as a processor 902 and a memory 903. The first communication interface 901 may, e.g., be a WLAN or Bluetooth interface. The memory 903 comprises instructions 904 executable by the processor 902, whereby the slave device 900 is operative to receive an identifier $ID_M$ associated with the master device 101 over the first communication channel 104, generate a proof-of-possession $X_S$ of a pre-shared key $K_S$, using $K_S$, $ID_M$, and a first identifier $ID_{S1}$ associated with the slave device 900, generate a key $MK_S$ using $ID_M$, $ID_{S1}$, and $K_S$, store $MK_S$, and transmit $ID_{S1}$ and $X_S$ to the master device 101. $MK_S$ may be stored in the memory 903. The slave device 900 is operative to receive $ID_M$, and transmit $ID_{S1}$ and $X_S$, via the first communication interface 901. Optionally, if the slave device 900 comprises an additional second communication interface 905 being adapted for communicating over a second communication channel 105 which is different from the first communication channel 104, the slave device 900 may further be operative to transmit $ID_{S1}$ and $X_S$ via the second communication interface 905.

If the slave device 900 comprises the second communication interface 905, the slave device 900 may further be operative to encode $ID_{S1}$ and $X_S$ into a representation which is suitable for transmission over the second communication channel 105, and transmit $ID_{S1}$ and $X_S$ to the master device 101 by transmitting the encoded representation via the second communication interface 905. The encoded representation may be audible sound, and the second communication interface 805 may be adapted to transmit the encoded representation by emitting the sound. For instance, the second communication interface 905 may comprise a loudspeaker, as is described with reference to FIG. 3. As an alternative, the encoded representation may be an image, and the second communication interface 905 may be adapted to transmit the encoded representation by displaying the image. In this case, the second communication interface 905 may be a display or a screen, as is described with reference to FIG. 4.

Figure 10:
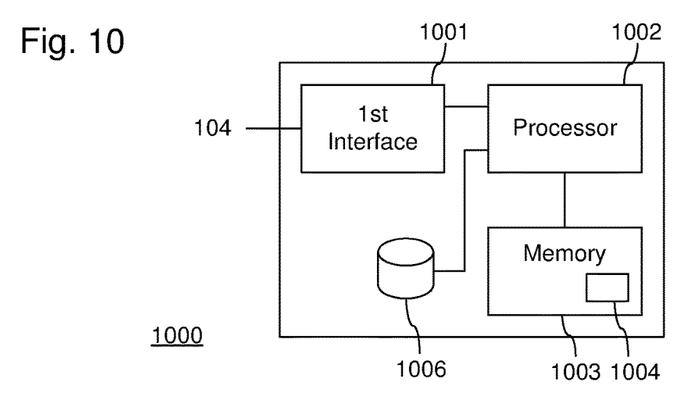
FIG. 10 shows a bootstrapping server for establishing a secure connection between a master device and a slave device, in accordance with an embodiment of the invention.

With reference to FIG. 10, an embodiment of the bootstrapping server 103 for establishing a secure connection between a master device 101 and a slave device 102 sharing at least a first communication channel 104, is described in the following. The bootstrapping server 1000 comprises a first communication interface 1001, being adapted for communicating with the master device 103 over a communications network, such as the Internet, and a processing means such as a processor 1002 and a memory 1003. The memory 1003 comprises instructions 1004 executable by the processor 1002, whereby the bootstrapping server 1000 is operative to receive a first identifier $ID_{S1}$ associated with the slave device 102, a proof-of-possession $X_S$ of a pre-shared key $K_S$, and an identifier $ID_M$ associated with the master device 101, from the master device 101, acquire $K_S$ using $ID_{S1}$, generate a proof-of-possession $X_B$ of $K_S$ using $K_S$, $ID_M$, and $ID_{S1}$, and if $X_B$ and $X_S$ are identical, generate a key $MK_B$ using $ID_M$, $ID_{S1}$, and $K_S$, and transmit $MK_B$ to the master device 101. $K_B$ may be acquired from a local storage, such as the memory 1003, or a local database 1006 which the bootstrapping server 1000 is provided with.

An embodiment of the bootstrapping server 1000 may further be operative to provide a user account to a user of the master device 101 which has paired a slave device, such as slave device 102, utilizing the bootstrapping process described herein. To this end, the user of the master device 101 may receive credentials, such as a username and a password, for accessing his or her user account after the bootstrapping process is completed. The user may subsequently use his/her account for the purpose of viewing and/or managing registered devices and relationships established between devices. For instance, a user may add an additional master device by login into the bootstrapping server, or bootstrapping portal, and requesting the bootstrapping server to generate credentials for the newly added master device based on an identity of the new master device, the identity of the slave device, i.e., $ID_{S1}$, and $K_B$. Information regarding the new master device, in particular its identity, may be communicated to the slave device via the first master device, directly from the bootstrapping server, or via the added master device.

Embodiments of the master device 800, the slave device 900, and the bootstrapping server 1000, may further be operative to perform in accordance with what was described hereinbefore, in particular with reference to FIGS. 1 to 7.

Even though embodiments of the master device 800, the slave device 900, and the bootstrapping server 1000, are hereinbefore described as being implemented by means of software, i.e., computer programs comprising instructions executable by a processor, it will be appreciated that processing means other than a processor, such as a general purpose processor, may be used. For instance, the processing means may be any suitable electronic circuitry adapted to perform in accordance with an embodiment of the invention, in particular in accordance with what is described with reference to FIGS. 1 to 7.

Throughout this disclosure, a processor may be a general purpose processor or any kind of processing means capable of executing instructions. Further, a memory may be a Random Access Memory (RAM), a Read Only Memory (ROM), a hard disk, a flash memory, or the like. A storage medium may, e.g., be a RAM, a ROM, a flash memory, a hard disk, a CD-ROM, a DVD, a Blu-ray disc, or the like. It will also be appreciated that an embodiment of the computer programs may be carried by an electronic signal, an optical signal, or a radio signal.

Figure 11:
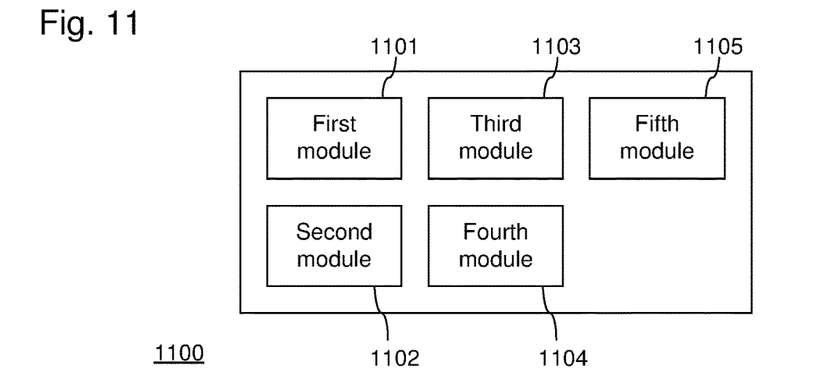
FIG. 11 shows a master device for establishing a secure connection with a slave device, in accordance with another embodiment of the invention.

An alternative embodiment of the master device 101 for establishing a secure connection with a slave device 102, the master device 101 and the slave device 102 sharing at least a first communication channel 104, is illustrated in FIG. 11. The master device 1100 comprises a first module 1101 configured to transmit an identifier $ID_M$ associated with the master device 1100 over the first communication channel 104, a second module 1102 configured to receive a first identifier $ID_{S1}$ associated with the slave device 101 and a proof-of-possession $X_S$ of a pre-shared key $K_S$ from the slave device 102, a third module 1103 configured to transmit $ID_{S1}$, $X_S$, and $ID_M$, to the bootstrapping server 103, a fourth module 1104 configured to receive a key $MK_B$ from the bootstrapping server 103, and a fifth module 1105 configured to store $MK_B$.

Optionally, the master device 1100 and the slave device 102 share a second communication channel 105 different from the first communication channel 104, and the second module 1102 may further be configured to receive $ID_{S1}$ and $X_S$ from the slave device 102 over the second communication channel 105.

The second module 1102 may further be configured to receive $ID_{S1}$ and $X_S$ by receiving an encoded representation which is suitable for transmission over the second communication channel 105, and the third module 1103 may further be configured to transmit $ID_{S1}$, $X_S$, and $ID_M$, to the bootstrapping server 103 by transmitting the encoded representation and $ID_M$ to the bootstrapping server 103. For instance, the encoded representation may be audible sound, and the second module 1102 may further be configured to receive the encoded representation by recording the sound. As an example, the second module 1102 may comprise a microphone, as is described with reference to FIG. 3. As an alternative, the encoded representation may be an image, and the second module 1102 may further be configured to receive the encoded representation by capturing the image. As an example, the second module 1102 may comprise a digital camera, as is described with reference to FIG. 4.

Figure 12:
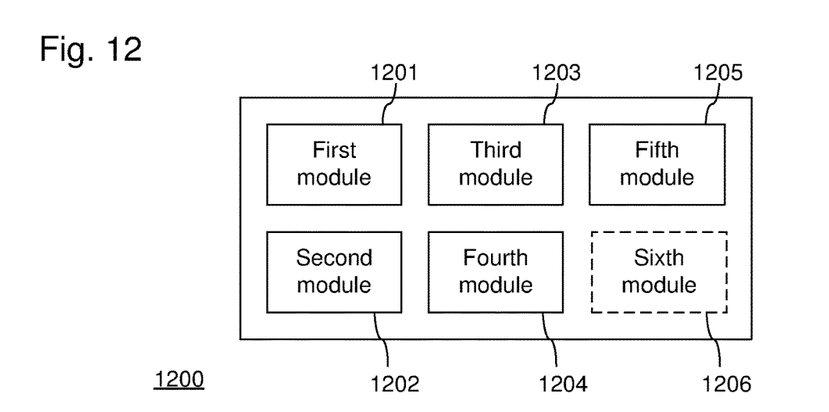
FIG. 12 shows a slave device for establishing a secure connection with a master device, in accordance with another embodiment of the invention.

An alternative embodiment of the slave device 102 for establishing a secure connection with a master device 101, the master device 101 and the slave device 102 sharing at least a first communication channel 104, is illustrated in FIG. 12. The slave device 1200 comprises a first module 1201 configured to receive an identifier $ID_M$ associated with the master device 101 over the first communication channel 104, a second module 1202 configured to generate a proof-of-possession $X_S$ of a pre-shared key $K_S$, using $K_S$, $ID_M$, and a first identifier $ID_{S1}$ associated with the slave device 1200, a third module 1203 configured to generate a key $MK_S$ using $ID_M$, $ID_{S1}$, and $K_S$, a fourth module 1204 configured to store $MK_S$, and a fifth module configured to transmit $ID_{S1}$ and $X_S$ to the master device 101.

Optionally, the master device 101 and the slave device 1200 may share a second communication channel 105 different from the first communication channel 104, and the fifth module 1205 may further be configured to transmit $ID_{S1}$ and $X_S$ from the slave device 1200 to the master device 101 over the second communication channel 105.

The slave device 1200 may further comprise a sixth module 1206 configured to encode $ID_{S1}$ and $X_S$ into a representation which is suitable for transmission over the second communication channel 105, and the fifth module 1205 may further be configured to transmit $ID_{S1}$ and $X_S$ to the master device 101 by transmitting the encoded representation to the master device 101. For instance, the encoded representation may be audible sound, and the fifth module 1205 may further configured to transmit the encoded representation by emitting the sound. As an example, the fifth module 1205 may comprise a loudspeaker, as is described with reference to FIG. 3. As an alternative, the encoded representation may be an image, and the fifth module 1205 may further be configured to transmit the encoded representation by displaying the image. As an example, the fifth module 1205 may comprise a display or a screen, as is described with reference to FIG. 3.

Figure 13:
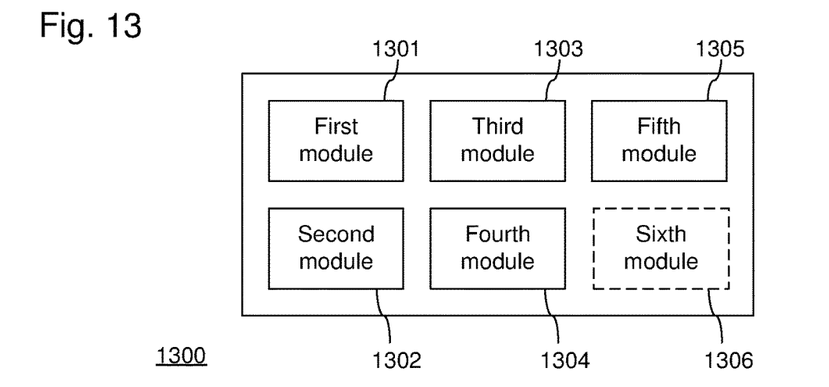
FIG. 13 shows a bootstrapping server for establishing a secure connection between a master device and a slave device, in accordance with another embodiment of the invention.

An alternative embodiment of the bootstrapping server 103 for establishing a secure connection between a master device 101 and a slave device 102 sharing at least a first communication channel 104 is illustrated in FIG. 13. The bootstrapping server 1300 comprises a first module 1301 configured to receive a first identifier $ID_{S1}$ associated with the slave device 102, a proof-of-possession $X_S$ of a pre-shared key $K_S$, and an identifier $ID_M$ associated with the master device 101, from the master device 101, a second module 1302 configured to acquire $K_S$ using $ID_{S1}$, a third module 1303 configured to generate a proof-of-possession $X_B$ of $K_S$ using $K_S$, $ID_M$, and $ID_{S1}$, and to check whether $X_B$ and $X_S$ are identical, a fourth module 1304 configured to generate, if $X_B$ and $X_S$ are identical, a key $MK_B$ using $ID_M$, $ID_{S1}$, and $K_S$, and a fifth module 1305 configured to transmit $MK_B$ to the master device 101.

Optionally, if the master device 101 and the slave device 102 share a second communication channel 105 different from the first communication channel 104, the first module 1301 is further configured to receive $ID_{S1}$, $X_S$, and $ID_M$ by receiving an encoded representation which is suitable for transmission over the second communication channel 105 and $ID_M$, and the bootstrapping server 1300 further comprises a sixth module 1306 configured to extract $ID_{S1}$ and $X_S$ from the encoded representation.

Embodiments of the master device 1100, the slave device 1200, and the bootstrapping server 1300, may comprise further modules being configured to perform in accordance with what was described hereinbefore, in particular with reference to FIGS. 1 to 10.

The modules comprised in the master device 1100, the slave device 1200, and the bootstrapping server 1300, may be implemented by means of hardware, i.e., electronic circuitry, or a combination of hardware and software.

The person skilled in the art realizes that the invention by no means is limited to the embodiments described above. On the contrary, many modifications and variations are possible within the scope of the appended claims.

The invention claimed is:

1. A method of establishing a secure connection between a master device and a slave device which share at least a first communication channel, the method being performed by the master device, the method comprising:
   transmitting an identifier $ID_M$ associated with the master device over the first communication channel to the slave device;
   receiving a first identifier $ID_{S1}$ associated with the slave device, and a proof-of-possession $X_S$ of a pre-shared key $K_S$ from the slave device, which key $K_S$ is known to the slave device and a bootstrapping server, and which proof-of-possession $X_S$ is generated by the slave device using $K_S$, $ID_M$, and $ID_{S1}$, using the same algorithm as is used by the bootstrapping server for generating a proof-of-possession $X_B$ of the key $K_S$;
   wherein the first identifier $ID_{S1}$ and the proof-of-possession $X_S$ are received from the slave device by the master device over a second communication channel shared between the master device and the slave device, wherein the second communication channel is different from the first communication channel and the receiving of $ID_{S1}$ and $X_S$ comprises receiving an encoded representation comprising at least one of the following: a recorded audible sound or a captured image;
   transmitting $ID_{S1}$, $X_S$, $ID_M$, and a nonce N generated either at the slave device or the at the master device to the bootstrapping server, wherein the nonce N is a time stamp;
   receiving, when $X_B$ and $X_S$ are identical, a key $MK_B$ from the bootstrapping server, wherein the key $MK_B$ is generated by the bootstrapping server using the same algorithm as is used for generating an identical key $MK_S$ at the slave device and the nonce N is used by the bootstrapping server to generate $X_B$ and $MK_B$; and
   storing $MK_B$.

2. The method of claim 1, wherein:
   receiving $ID_{S1}$ and $X_S$ comprises receiving the encoded representation which is suitable for transmission over the second communication channel; and
   transmitting $ID_{S1}$, $X_S$, $ID_M$, to the bootstrapping server comprises transmitting the encoded representation and $ID_M$ to the bootstrapping server.

3. The method of claim 2, wherein the encoded representation is the recorded audible sound, and wherein receiving the encoded representation comprises recording the audible sound.

4. The method of claim 2, wherein the encoded representation is the captured image, and wherein receiving the encoded representation comprises capturing the image.

5. The method of claim 1, further comprising using the key $MK_B$ as a shared secret for securely communicating with the slave device.

6. The method of claim 1, wherein the master device is one of a mobile phone and a tablet computer.

7. A method of establishing a secure connection between a master device and a slave device which share at least a first communication channel, the method being performed by the slave device, the method comprising:
   receiving an identifier $ID_M$ associated with the master device over the first communication channel to the master device;
   generating a proof-of-possession $X_S$ of a pre-shared key $K_S$, which key $K_S$ is known to the slave device and a bootstrapping server, wherein the proof-of-possession $X_S$ is generated using $K_S$, $ID_M$, and a first identifier $ID_{S1}$ associated with the slave device, using the same algorithm as is used by the bootstrapping server for generating a proof-of-possession $X_B$ of the key $K_S$;
   transmitting $ID_{S1}$ $X_S$, $ID_M$, and a nonce N generated either at the slave device or at the master device to the bootstrapping server, wherein the nonce N is a time stamp;
   generating, when $X_B$ and $X_S$ are identical, a key $MK_S$ using $ID_M$, $ID_{S1}$, and $K_S$, using the same algorithm as is used by the bootstrapping server for generating an identical key $MK_B$ and the nonce N is used by the bootstrapping server to generate $X_B$ and $MK_B$;
   storing $MK_S$; and
   transmitting $ID_{S1}$ and $X_S$ to the master device,
      wherein the first identifier $ID_{S1}$ and the proof-of-possession $X_S$ are transmitted from the slave device to the master device over a second communication channel shared between the master device and the slave device, wherein the second communication channel is different from the first communication channel and transmitting $ID_{S1}$ and $X_S$ comprises transmitting an encoded representation comprising at least one of the following: an emitted sound and a displayed image.

8. The method of claim 7, further comprising:
   wherein the encoded representation is generated by encoding $ID_{S1}$ and $X_S$ into a representation which is suitable for transmission over the second communication channel; and
   wherein transmitting $ID_{S1}$ and $X_S$ to the master device comprises transmitting the encoded representation to the master device.

9. The method of claim 8, wherein the encoded representation is emitted sound, and wherein transmitting the encoded representation comprises emitting the audible sound.

10. The method of claim 8, wherein the encoded representation is the displayed image, and wherein transmitting the encoded representation comprises displaying the image.

11. The method of claim 7, further comprising using the key $MK_S$ as a shared secret for securely communicating with the master device.

12. A method of establishing a secure connection between a master device and a slave device which share at least a first communication channel, the method being performed by the bootstrapping server, the method comprising:
receiving a first identifier $ID_{S1}$ associated with the slave device, a proof-of-possession $X_S$ of a pre-shared key $K_S$, which key $K_S$ is known to the slave device and the bootstrapping server and an identifier $ID_M$ associated with the master device, from the master device;
wherein receiving the first identifier $ID_{S1}$ and the proof-of-possession $X_S$ from the master device comprises receiving an encoded representation suitable for transmission over a second communication channel shared between the master device and the slave device, wherein the second communication channel is different from the first communication channel and the encoded representation comprises at least one of the following: a recorded audible sound or a captured image;
acquiring $K_S$ using $ID_{S1}$;
receiving a nonce N generated either at the slave device or at the master device, wherein the nonce N is a time stamp;
generating a proof-of-possession $X_B$ of $K_S$ using $K_S$, $ID_M$, the nonce N and $ID_{S1}$, using the same algorithm as is used by the slave device for generating the proof-of-possession $X_S$;
when $X_B$ and $X_S$ are identical:
generating a key $MK_B$ using $ID_M$, $ID_{S1}$, the nonce N and $K_S$, using the same algorithm as is used by the slave device for generating an identical key $MK_S$; and
transmitting $MK_B$ to the master device.

13. The method of claim 12, the method further comprising: extracting $ID_{S1}$ and $X_S$ from the encoded representation.

14. A non-transitory computer-readable medium comprising, stored thereupon, a computer program comprising instructions, the instructions being configured for:
execution by a processor in a master device that shares at least a first communication channel, the instructions, the instructions being further configured so as to cause the processor executing the instructions to:
transmit an identifier $ID_M$ associated with the master device over the first communication channel to the slave device;
receive a first identifier $ID_{S1}$ associated with the slave device, and a proof-of-possession $X_S$ of a pre-shared key $K_S$ from the slave device, which key $K_S$ is known to the slave device and a bootstrapping server, and which proof-of-possession $X_S$ is generated by the slave device using $K_S$, $ID_M$, and $ID_{S1}$, using the same algorithm as is used by the bootstrapping server for generating a proof-of-possession $X_B$ of the key $K_S$;
wherein the first identifier $ID_{S1}$ and the proof-of-possession $X_S$ are received from the slave device by the master device over a second communication channel shared between the master device and the slave device, wherein the second communication channel is different from the first communication channel and the receiving of $ID_{S1}$ and $X_S$ comprises receiving an encoded representation comprising at least one of the following: a recorded audible sound or a captured image;
transmit $ID_{S1}$, $X_S$, $ID_M$, and a nonce N generated either at the slave device or at the master device to the bootstrapping server, wherein the nonce N is a time stamp;
receive, when $X_B$ and $X_S$ are identical, a key $MK_B$ from the bootstrapping server, wherein the key $MK_B$ is generated by the bootstrapping server using the same algorithm as is used for generating an identical key $MK_S$ at the slave device and the nonce N is used by the bootstrapping server to generate $X_B$ and $MK_B$; and
store $MK_B$.

15. A master device for establishing a secure connection with a slave device, the master device and slave device sharing at least first a communication channel, the master device comprising:
a communication interface circuit configured to communicate with the slave device over the first communication channel, and
a processing circuit comprising a processor and a memory, wherein the processing circuit is configured to:
transmit an identifier $ID_M$ associated with the master device over the first communication channel to the slave device, via the communication interface circuit;
receive a first identifier $ID_{S1}$ associated with the slave device, and a proof-of-possession $X_S$ of a pre-shared key $K_S$ from the slave device, which key $K_S$ is known to the slave device and a bootstrapping server, and which proof-of-possession $X_S$ is generated by the slave device using $K_S$, $ID_M$, and $ID_{S1}$, using the same algorithm as is used by the bootstrapping server for generating a proof-of-possession $X_B$ of the key $K_S$;
wherein the first identifier $ID_{S1}$ and the proof-of-possession $X_S$ are received from the slave device by the master device over a second communication channel shared between the master device and the slave device, wherein the second communication channel is different from the first communication channel and the receiving of $ID_{S1}$ and $X_S$ comprises receiving an encoded representation comprising at least one of the following: a recorded audible sound or a captured image;
transmit $ID_{S1}$, $X_S$, $ID_M$, and a nonce N generated either at the slave device or at the master device to the bootstrapping server, wherein the nonce N is a time stamp;
receive, when $X_B$ and $X_S$ are identical, a key $MK_B$ from the bootstrapping server, wherein the key $MK_B$ is generated by the bootstrapping server using the same algorithm as is used for generating an identical key $MK_S$ at the slave device and the nonce N is used by the bootstrapping server to generate $X_B$ and $MK_B$; and
store $MK_B$.

16. The master device of claim 15, wherein the processing circuit is configured to:
receive $ID_{S1}$ and $X_S$ by receiving the encoded representation which is suitable for transmission over the second communication channel; and
transmit $ID_{S1}$, $X_S$, $ID_M$, to the bootstrapping server by transmitting the encoded representation and $ID_M$ to the bootstrapping server.

17. The master device of claim 16, wherein the encoded representation is the recorded audible sound, and wherein the processing circuit is configured to receive the encoded representation by recording the audible sound.

18. The method of claim 16, wherein the encoded representation is the captured image, and wherein the processing circuit is configured to receive the encoded representation by capturing the image.

19. The master device of claim 15, wherein the processing circuit is configured to use the key $MK_B$ as a shared secret for securely communicating with the slave device.

20. The master device of claim 15, being one of a mobile phone and a tablet computer.

21. A slave device for establishing a secure connection with a master device, the master device and the slave device sharing at least a first communication channel, the slave device comprising:
   a communication interface circuit configured to communicate with the master device over the first communication channel, and
   a processing circuit comprising a processor and a memory, wherein the processing circuit is configured to:
      receive an identifier $ID_M$ associated with the master device over the first communication channel to the master device;
      generate a proof-of-possession $X_S$ of a pre-shared key $K_S$, which key $K_S$ is known to the slave device and a bootstrapping server, wherein the proof-of-possession $X_S$ is generated using $K_S$, $ID_M$, and a first identifier $ID_{S1}$ associated with the slave device, using the same algorithm as is used by the bootstrapping server for generating a proof-of-possession $X_B$ of the key $K_S$;
      transmit $ID_{S1}$ $X_S$, $ID_M$, and a nonce N generated either at the slave device or at the master device to the bootstrapping server, wherein the nonce N is a time stamp;
      generate, when $X_B$ and $X_S$ are identical, a key $MK_S$ using $ID_M$, $ID_{S1}$, and $K_S$, using the same algorithm as is used by the bootstrapping server for generating an identical key $MK_B$ and the nonce N is used by the bootstrapping server to generate $X_B$ and $MK_B$;
      store $MK_S$; and
      transmit $ID_{S1}$ and $X_S$ to the master device;
         wherein the first identifier $ID_{S1}$ and the proof-of-possession $X_S$ are transmitted from the slave device to the master device over a second communication channel shared between the master device and the slave device, wherein the second communication channel is different from the first communication channel and transmitting $ID_{S1}$ and $X_S$ comprises transmitting an encoded representation comprising at least one of the following: an emitted sound and a displayed image.

22. The slave device of claim 21, wherein the processing circuit is further configured to:
   generate the encoded representation by encoding $ID_{S1}$ and $X_S$ into a representation which is suitable for transmission over the second communication channel; and
   transmit $ID_{S1}$ and $X_S$ to the master device by transmitting the encoded representation to the master device.

23. The method of claim 22, wherein the encoded representation is emitted audible sound, and wherein the processing circuit is configured to transmit the encoded representation by emitting the audible sound.

24. The method of claim 22, wherein the encoded representation is the displayed image, and wherein the processing circuit is configured to transmit the encoded representation by displaying the image.

25. The slave device of claim 21, wherein the processing circuit is configured to use the key $MK_S$ as a shared secret for securely communicating with the master device.

26. A bootstrapping server for establishing a secure connection between a master device and a slave device sharing at least a first communication channel, the bootstrapping server comprising:
   a communication interface circuit configured to communicate with the master device over a communication network, and
   a processing circuit comprising a processor and a memory, wherein the processing circuit is configured to:
      receive a first identifier $ID_{S1}$ associated with the slave device, a proof-of-possession $X_S$ of a pre-shared key $K_S$, which key $K_S$ is known to the slave device and the bootstrapping server, and an identifier $ID_M$ associated with the master device, from the master device;
         wherein receiving the first identifier $ID_{S1}$ and the proof-of-possession $X_S$ from the master device comprises receiving an encoded representation suitable for transmission over a second communication channel shared between the master device and the slave device, wherein the second communication channel is different from the first communication channel and the encoded representation comprises at least one of the following: a recorded audible sound or a captured image;
      acquire $K_S$ using $ID_{S1}$;
      receive a nonce N generated either at the slave device or at the master device, wherein the nonce N is a time stamp;
      generate a proof-of-possession $X_B$ of $K_S$ using $K_S$, $ID_M$, the nonce N and $ID_{S1}$, using the same algorithm as is used by the slave device for generating the proof-of-possession $X_S$;
      when $X_B$ and $X_S$ are identical:
         generate a key $MK_B$ using $ID_M$, $ID_{S1}$, the nonce N and $K_S$, using the same algorithm as is used by the slave device for generating an identical key $MK_S$; and
         transmit $MK_B$ to the master device.

27. The bootstrapping server of claim 26, wherein the processing circuit is configured to: extract $ID_{S1}$ and $X_S$ from the encoded representation.

* * * * *